Aug. 29, 1933.  G. C. HOWARD  1,924,361
PROCESS OF TREATING WASTE SULPHITE LIQUOR
Filed Oct. 28, 1930
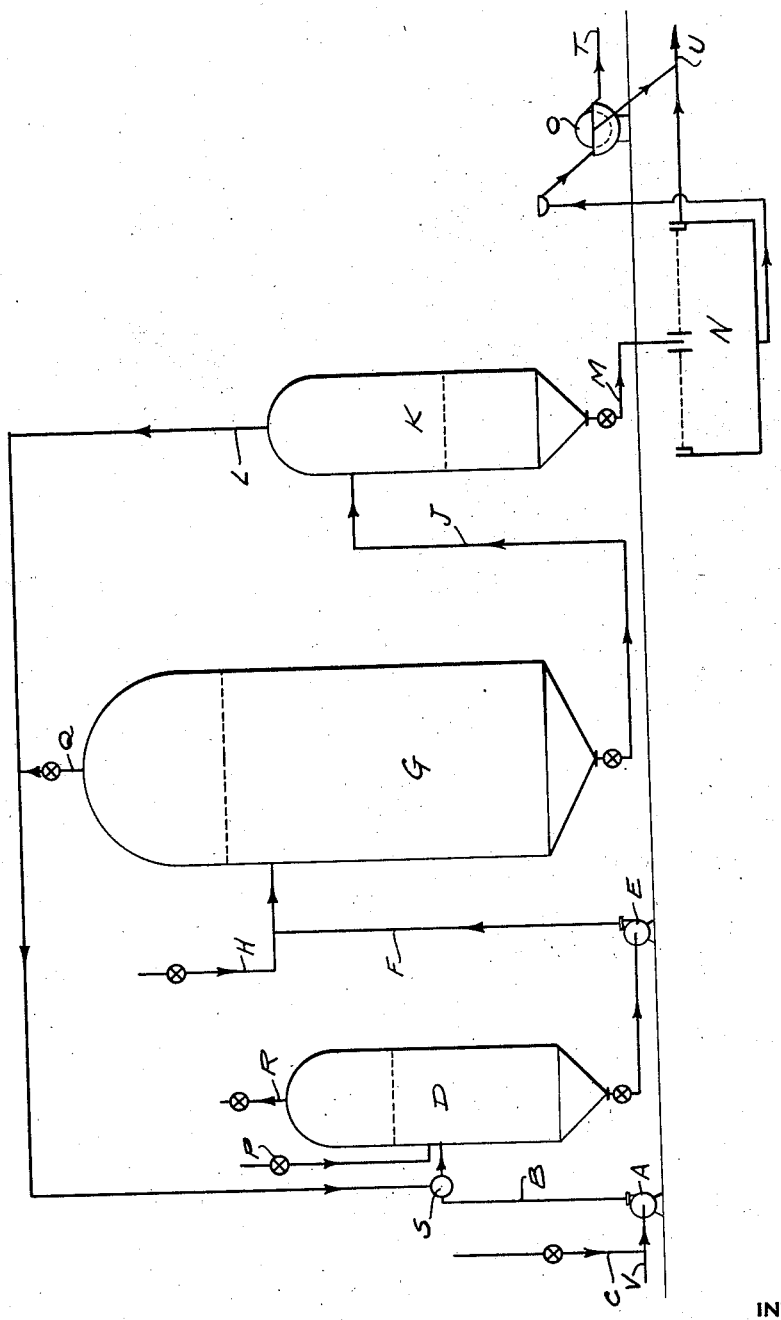
INVENTOR
Guy C. Howard
BY
Dyke and Schamies
ATTORNEYS Patented Aug. 29, 1933

1,924,361

UNITED STATES PATENT OFFICE 1,924,361

PROCESS OF TREATING WASTE SULPHITE LIQUOR

Guy C. Howard, Wausau, Wis.

Application October 28, 1930. Serial No. 491,665

9 Claims. (Cl. 252—7)

This invention relates to a process of preliminary treatment of waste sulphite liquor with caustic lime in solid phase form for the precipitation and recovery of solid material, and of subsequent treatment of the residual liquid effluent resulting therefrom.

The preliminary treatment with caustic lime may be such as to recover solid material either as (1) an initial precipitate, which consists principally of calcium sulphite followed by a separately recovered precipitate which is principally organic or (2) a precipitate which is a mixture of the solid materials which are separately recovered under the treatment just described as (1).

The effluent in each case is a liquid having dissolved therein the soluble carbohydrate substances of the original waste sulphite liquor together with more or less of the lignin component of said original liquor in soluble form and together with a material amount of the sulphur content of said original liquor likewise in dissolved form.

The preliminary treatments referred to are preferably carried out in accordance with my patented process of U. S. Patent, Reissue No. 18,268 dated December 1, 1931, and the process of U. S. Patent No. 1,856,558 dated May 3, 1932.

The purpose of the invention is (1) to more completely eliminate the objectionable properties of waste sulphite liquor as a trade waste when discharged into waterways through removal of practically all the lignin component of the aforesaid effluent and through the removal of a material amount of the sulphur content of such effluent and through greater or less alterations in the carbohydrate substances contained in such effluent into less objectionable form, and (2) to purify the aforesaid effluent by such removal of lignin substance and reduction in sulphur content whereby the residual carbohydrate substances are available in a higher state of purity for any subsequent utilization, and (3) to effect alterations in the carbohydrate substances themselves which are favorable to subsequent recovery in various derived products, and (4) to carry on said operations by preferably a continuous process.

The process involved in this invention will be described with reference to the accompanying drawing which is a diagrammatical side elevation of an apparatus suitable for treating the liquid effluent hereinbefore referred to. A is a pump which draws, through pipe V, the aforesaid liquid effluent, constituting the feed liquor for the process, direct from its source or from an interposed storage tank and discharges it through pipe B into tank D. C is a pipe through which caustic lime reagent in solid phase form can be added in controlled amounts to the feed liquor if and when resired. D is a covered tank of suitable design which serves as a preheater for the incoming liquors as will be described later. E is a pump which draws the liquor from the bottom of D and discharges it through pipe F into a tension vessel or digester G in which the liquors are further heated by admission of live steam from pipe H in sufficient amount to subject the liquors in digester G to a steam pressure cooking treatment. J is a pipe through which the cooked liquor is withdrawn from the bottom of digester G and transferred into a pressure reducing or blow tank K as a result of the higher pressure in digester G. The tank K is a closed vessel from which a steam exit pipe L allows the steam released by the liquor on entering reduction tank K to pass into the incoming feed liquor in pipe B and is thereby utilized to raise the temperature of the feed liquor. S represents suitable means to function in principle as a pet condenser whereby such aspirating or vacuum effect, as is possible with the relatively high temperature of the liquor in pipe B, will be effected to facilitate the withdrawal through pipe L of steam released from the liquor in blow tank K. M is a pipe through which the liquor is withdrawn from the bottom of tank K and passes to a setling tank N in which the precipitated products of the process are settled out and pumped as a sludge to a filter O from which they are taken off as a wet cake at T for further treatment or use as may be desired. The filtrate from filter O together with the clear hot decant or overflow from settling tank N constitute the final purified effluent of the process which is discharged at U direct to sewer or given further treatments, which are not a part of this invention, for the recovery of commercial products or the utilization of their heat content. P is a pipe through which live or exhaust steam can be admitted into preheating tank D to heat the liquor therein if desired. Q is a pipe which connects with pipe L and allows the digester G to be vented when necessary to remove accumulated non-condensable gases originating from the live steam or from the liquors themselves. R is a vent pipe in tank D which normally is open to the air. The process liquors are of alkaline pH value and non-corrosive hence steel equipment and piping can be used but provision will naturally be made for proper insulation against heat losses and for the necessary valves and other auxiliaries.

The aforesaid incoming feed liquor consists of the effluent liquid after preliminary treatment of waste sulphite liquor as in the patented processes previously referred to with solid phase caustic lime at atmospheric pressure and a temperature not exceeding 100° C., effecting precipitation of inorganic matter and organic matter comprising the greater portion of the lignin substance contained in the original waste sulphite liquor and separating out the precipitate. This feed liquor, incoming at V, normally will have a pH value around 12.0 and a temperature for example of 70° C. For reasons to be stated later it is preferable to supply a relatively small amount of caustic lime in solid phase form or other suitable reagent to the feed liquors, such amount being sufficient to sustain the degree of alkalinity of the liquid during the pressure cooking operation, and this reagent is added in controlled amount through pipe C. As the liquor is pumped through B at a continuous and controlled rate, it is heated by the steam release from tank K and when necessary additional steam is supplied through pipe P so that normally the liquor in tank D has a temperature approaching 100° C. and is at atmospheric pressure. In addition to serving as a pre-heater this tank D also functions as a limited storage for hot liquor and its design will be determined accordingly.

From tank D the preheated liquor is pumped at a continuous and controlled rate into digester G and live steam is admitted in an amount sufficient to maintain the liquor in G at the desired pressure (temperature) for example 50 lbs. gauge pressure, and the capacity design of this digester G will be such as to allow the liquor to remain therein, under steam pressure cooking conditions, for the necessary time, for example one (1) hour or more. During such pressure treatment a precipitate will form but ordinarily in relatively small amounts since a major portion of the lignin component of the original waste sulphite liquor has preferably been previously precipitated and removed by a caustic lime treatment at atmospheric pressure. This prior removal of the major portion of such precipitatable organic matter greatly facilitates the use of a continuous cooking treatment with its inherent advantages and economies which is one of the features of this invention. The aforesaid precipitate will be altered during the cooking treatment to render it insoluble under some acid conditions and concurrently with this the dissolved carbohydrate substances will be converted more or less completely into various derivatives thereof resulting from such alkaline steam pressure treatment. Some of such derivatives are acid in character and tend to form calcium salts thus reducing the available lime alkalinity of the system with a material lowering of its pH value. It is this condition which necessitates the aforesaid addition in some cases of caustic lime or other equivalent reagent to the incoming feed liquor to assure the presence of sufficient available lime throughout the cooking treatment to sustain the desired lime alkalinity. For example, a feed liquor having a pH value of plus 12.0 and containing 1.1 grams per liter of available CaO as determined by titration with standard acid and phenolphthalien indicator was found to have a pH value of 8.8 after a two (2) hour cook at 75 lbs. steam pressure and to carry no available CaO as tested by the above method. On the other hand when a small amount of caustic lime was added to the same feed liquor and it was given a pressure cook for two (2) hours at 75 lbs. the pH value remained at plus 12.0 and available CaO was still present to the amount of 0.6 gram per liter.

The cooked liquors in digester G are withdrawn continuously and at a controlled rate from the bottom through pipe J and discharged into blow tank K which is operated at approximately atmospheric pressure. Steam is thereby released from the process liquor in tank K and passes through pipe L to be used in heating the incoming feed liquors as above described, and the process liquors in K are reduced to a temperature corresponding to the operating pressure in tank K namely, approximating 100° C.

The process liquor is withdrawn continuously and at a controlled rate from the bottom of tank K and flows by gravity to a settling tank N of suitable design in which the suspended solids in such process liquor settle and are withdrawn as a sludge to filter O and the clear decant or overflow liquor from settling tank N together with the filtrate from O constitute the purified effluent from the process.

The solid product removed by filter O at T contains precipitated lignin substance containing organically combined sulphur together with more or less admixed calcium sulphite and other inorganic compounds and together with such insoluble organic constituents as may have resulted from combination of lignin substance with carbohydrate substances or from the carbohydrate substances themselves during the cooking treatment. Its solubility characteristics will depend to some extent on the pressure (temperature) and duration of the pressure cooking treatment but normally its organic matter content will be insoluble in acids such for example as carbonic acids, sulphurous acid solutions at atmospheric pressures, hydrochloric acid and sulphuric acid.

The purified effluent liquor removed at U as decant from settling tank N and filtrate from filter O contains the carbohydrate substances of the original waste sulphite liquor which have been partially or completely converted by treatment under conditions of caustic lime alkalinity into various soluble derivatives of said carbohydrate substances. In relation to the feed liquors prior to such steam pressure cooking treatment and on an equivalent basis of dilution this purified liquid product normally shows (1) a substantial reduction in sulphur content (exclusive of sulphates) due to removal of such sulphur in the aforesaid precipitated matter, (2) a material reduction in content of organic matter due to its removal in said precipitated product, (3) a substantial reduction in its inorganic ash components, (4) a marked diminution of the copper number as determined by Fehling's test, and (5) an increase in content of various salts of organic acids and other derivatives of the carbohydrate substances present in the original waste sulphite liquor.

Among the advantages of the invention are the accomplishing of the previously recited purposes in a very complete and efficient manner, preferably as a continuous process, and with minimum installation and operating cost.

I claim:

1. The process which comprises treating waste sulphite liquor with solid phase caustic lime at atmospheric pressure and at a temperature not exceeding 100° C. to obtain a liquor of alkalinity of the order of pH=12.0 and precipitated inorganic and organic matter, separating solids and liquid, subjecting said liquid to a steam pressure cook under conditions of sustained caustic lime alkalinity thereby precipitating additional inorganic and organic matter, and separating such precipitated matter from the resulting liquid.

2. The process which comprises treating waste sulphite liquor with solid phase caustic lime at atmospheric pressure and at a temperature not exceeding 100° C. to obtain a liquor of alkalinity of the order of pH=12.0 and precipitated inorganic and organic matter, separating solids and liquid, adding solid phase caustic lime to the liquid in amount sufficient to sustain a caustic lime alkalinity during subsequent cooking treatment, but not in large excess over such requirement, and subjecting it to a steam pressure cook thereby precipitating additional inorganic and organic matter, and separating such precipitated matter from the resulting liquid.

3. The process which comprises treating waste sulphite liquor with solid phase caustic lime at atmospheric pressure and at a temperature not exceeding 100° C. and thereby effecting its separation into a precipitate which is principally inorganic, a precipitate which is principally organic and comprises the greater portion of the lignin substance contained in such liquor, and an effluent liquor containing carbohydrate substances and having an alkalinity of the order pH=12.0, and subjecting said effluent liquor to a steam pressure cook under conditions of sustained caustic lime alkalinity.

4. The process which comprises treating waste sulphite liquor with solid phase caustic lime at atmospheric pressure and at a temperature not exceeding 100° C. and thereby effecting its separation into a precipitate which is principally inorganic, a precipitate which is principally organic and comprises the greater portion of the lignin substance contained in such liquor, and an effluent liquor containing carbohydrate substances and having an alkalinity of the order pH=12.0, and subjecting said effluent liquor to a steam pressure cook under conditions of sustained caustic lime alkalinity, the temperature and duration of said cook being sufficient to cause the formation of a precipitate containing sulphur chemically combined with organic matter.

5. The process which comprises treating waste sulphite liquor with solid phase caustic lime at atmospheric pressure and at a temperature not exceeding 100° C. to obtain a liquor of an alkalinity of the order of pH=12.0, separating therefrom the precipitated solids, continuously subjecting the residual liquor to a steam pressure cook under conditions of sustained caustic lime alkalinity, and continuously removing and separating the products of such cooking treatment, the temperature and duration of said steam pressure cook being sufficient to cause the formation of a precipitate containing sulphur chemically combined with organic matter.

6. The process which comprises continuously feeding to a steam pressure cook, waste sulphite liquor from which matter comprising the greater portion of the lignin substance of the original waste sulphite liquor has been precipitated by treatment with solid phase caustic lime at atmospheric pressure and at a temperature not exceeding 100° C. in solid phase form to an alkalinity of the order of pH=12.0 and removed, continuously releasing liquid from said pressure cook thereby causing continuous release of steam from said liquid, and using such steam for continuously preheating the stream of material fed into the steam pressure cook.

7. The process which comprises continuously subjecting to a steam pressure cook under conditions of sustained caustic lime alkalinity waste sulphite liquor from which the greater portion of its lignin constituent has been precipitated by its lignin constituent has been precipitated by caustic lime treatment at not exceeding atmospheric pressure and 100° C. and removed, and continuously removing and separating the products of such cooking treatment, the temperature and duration of said steam pressure cook being sufficient to cause the formation of a precipitate containing sulphur chemically combined with organic matter.

8. The process which comprises subjecting to a steam pressure cook under conditions of sustained caustic lime alkalinity waste sulphite liquor from which the greater portion of its lignin constituent has been precipitated by treatment with caustic lime at atmospheric pressure and at a temperature not exceeding 100° C. and removed, releasing liquid from said pressure cook thereby causing release of steam from said liquid, and using such steam for preheating the material to be fed into said steam pressure cook.

9. The process of claim 1 in which the steam pressure cook is carried on with continuous inflow of the liquid to be cooked, continuous release of liquid from the cook, and the use of steam freed by such release for continuously preheating the stream of liquid fed into the steam pressure cook.

GUY C. HOWARD.